(12) United States Patent
Haustein et al.

(10) Patent No.: US 7,962,690 B2
(45) Date of Patent: Jun. 14, 2011

(54) APPARATUS AND METHOD TO ACCESS DATA IN A RAID ARRAY

(75) Inventors: Nils Haustein, Soergenloch (DE); Craig Anthony Klein, Tucson, AZ (US); Karl Allen Nielsen, Tucson, AZ (US); Ulf Troppens, Mainz (DE); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 11/969,753

(22) Filed: Jan. 4, 2008

(65) Prior Publication Data

US 2009/0177838 A1    Jul. 9, 2009

(51) Int. Cl.
*G06F 12/00* (2006.01)
*G06F 13/00* (2006.01)
*G06F 13/28* (2006.01)

(52) U.S. Cl. ................................ 711/114; 711/E12.005
(58) Field of Classification Search .................. 711/114, 711/E12.005
See application file for complete search history.

(56) References Cited

U.S. PATENT DOCUMENTS

| | | | |
|---|---|---|---|
| 6,105,127 A * | 8/2000 | Kimura et al. ................ 712/215 |
| 6,647,514 B1 | 11/2003 | Umberger |
| 6,834,315 B2 | 12/2004 | Johnson |
| 7,136,970 B2 | 11/2006 | Yoshiya et al. |
| 2005/0210304 A1 | 9/2005 | Hartung et al. |
| 2007/0011401 A1 | 1/2007 | Zhang et al. |

* cited by examiner

*Primary Examiner* — Sheng-Jen Tsai
(74) *Attorney, Agent, or Firm* — Dale F. Regelman; Quarles & Brady LLP

(57) ABSTRACT

A method to access a data in a RAID array comprising a plurality of data storage media, wherein information is written to said plurality of data storage media using a RAID configuration, wherein the method receives from a requester a command comprising a data access priority indicator. If a RAID rebuild is in progress, the method determines if the data access priority indicator is set. If the data access priority indicator is set, the method executes a command selected from the group consisting of writing information to the target logical block array range, and returning to the requestor information read from the target logical block array range.

19 Claims, 5 Drawing Sheets

APPARATUS AND METHOD TO ACCESS DATA IN A RAID ARRAY

FIELD OF THE INVENTION

This invention relates to an apparatus and method to access data in a RAID array.

BACKGROUND OF THE INVENTION

Computing systems generate information. It is known in the art to store such information using a plurality of data storage media. In a redundant array of independent disks ("RAID") configuration, information is stored in arrays of data storage media to provide fault tolerance and improved data access performance. RAID combines physical data storage media into a single logical unit either by using special hardware or software.

In a RAID 3, 4, 5, or 6 array configuration a process known as "data striping" is used in combination with parity data, i.e. encoded redundant information. In RAID 5, data and parity data, are distributed across all the data storage media in the array, but in RAIDs 3 and 4, parity data is not distributed across all storage media but is concentrated in a single parity storage media. In RAID 3, 4, and 5, row stripes are used and one set of parity data is associated with each row stripe. In RAID 6, both row stripes and diagonal stripes are used, and one set of parity is associated with each row stripe and another set of parity is associated with each diagonal stripe, for dual redundancy. In RAID 6, row parity may be concentrated in a single row parity storage media, and diagonal parity may be concentrated in a different single diagonal parity storage media, or row and diagonal parity may be distributed across all data storage media in the array. Each RAID stripe comprises a predetermined number of sequential logical block arrays.

By striping data and distributing the parity across all drives in the array, optimum performance is realized by minimizing constant access to a single drive. If a drive fails in a RAID 5 array configuration, data written to the failed drive can be rebuilt using the parity data on the remaining drives. If the array is configured with an online spare drive, the RAID rebuild begins automatically when a failed drive is detected. If the array is not configured with a spare drive, then the RAID rebuild begins after the failed drive is replaced.

To rebuild lost data, each lost stripe is read from the remaining drives in the array. The lost stripe is restored using exclusive-OR ("XOR") operations performed by a RAID controller XOR engine. After the XOR engine restores the lost stripe, that restored stripe is written to the replacement or online spare drive. The rebuilt process involves (N−1) reads from the operational drives in the array and a single write to the replacement or online spare drive. When a stripe is fully restored, the rebuild process proceeds to restore the next lost stripe.

During the rebuild process, the array remains accessible to users. Using prior art methods, performance of data access during a RAID rebuild is, however, compromised.

SUMMARY OF THE INVENTION

Applicants' invention includes an apparatus and method to access a data in a RAID array comprising a plurality of data storage media, wherein information is written to said plurality of data storage media using a RAID configuration. The method receives from a requestor a command selected from the group consisting of writing information to, and reading information from, one or more of said plurality of data storage media, wherein said command comprises a data access priority indicator. The method further establishes a target logical block array range, and determines if a RAID rebuild of the plurality of data storage media is in progress. If a RAID rebuild of said plurality of data storage media is in progress, the method determines if each of one or more stripes comprising the target logical block array range have already been rebuilt.

If each of one or more stripes comprising said target logical block array range have already been rebuilt, the method determines if the data access priority indicator is set. If the data access priority indicator is set, the method executes a command selected from the group consisting of writing information to the target logical block array range, and returning to the requestor information read from the target logical block array range.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
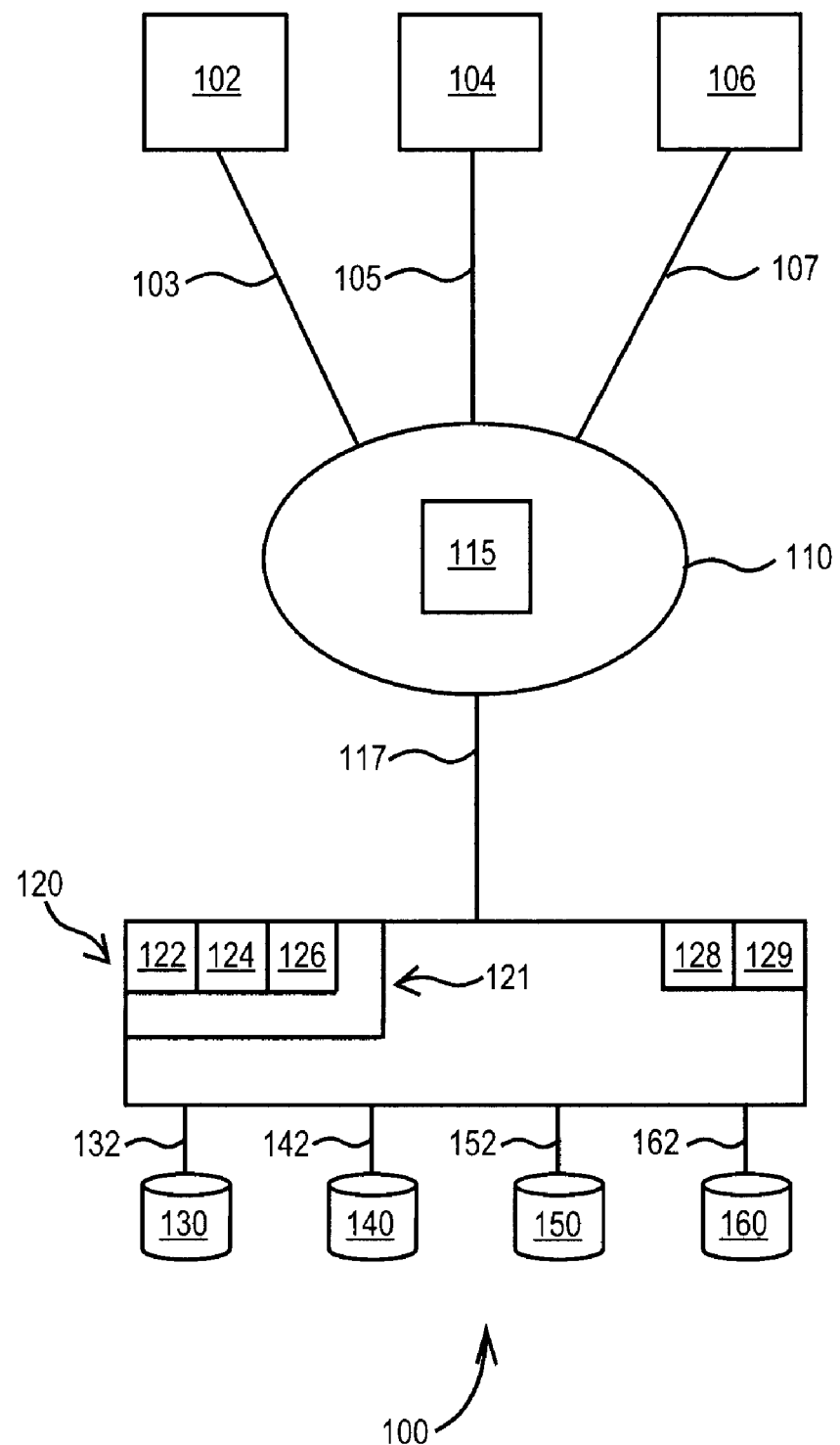
FIG. 1 is a block diagram showing one embodiment of Applicants' computing system.

In the illustrated embodiment of FIG. 1, computing system 100 comprises RAID controller 120 and data storage media 130, 140, 150, and 160. In the illustrated embodiment of FIG. 1, RAID controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' RAID controller 120 is in communication with host computers 102, 104, and 106. As a general matter, hosts computers 102, 104, and 106, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' RAID controller 120 comprises processor 128, XOR engine 129, memory 121, microcode 122 written to memory 121, and instructions 124 written to memory 121. Processor 128 utilizes microcode 122 to operate RAID controller 120. In the illustrated embodiment of FIG. 1, Applicants' RAID controller 120 further comprises rebuild bitmap 126, wherein rebuild bitmap comprises (N) indicators, and wherein each indicator is associated with a different data stripe. If the (i)th indicator is set to a first value, then the associated data stripe has not been rebuilt, and wherein if the (i)th indicator is set to a second value, then the associated data stripe has been rebuilt, wherein (i) is greater than or equal to 1 and less than or equal to (N).

In the illustrated embodiment of FIG. 1, host computers 102, 104, and 106, are connected to fabric 110 utilizing I/O protocols 103, 105, and 107, respectively. I/O protocols 103, 105, and 107, may be any type of I/O protocol; for example, a Fibre Channel ("FC") loop, a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to RAID controller 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from RAID controller 120, and subsequently data storage media 130, 140, 150, and 160. In other embodiments, one or more host computers, such as for example and without limitation host computers 102, 104, and 106, communicate directly with RAID controller 120 using I/O protocols 103, 105, and 107, respectively.

Figure 2A:
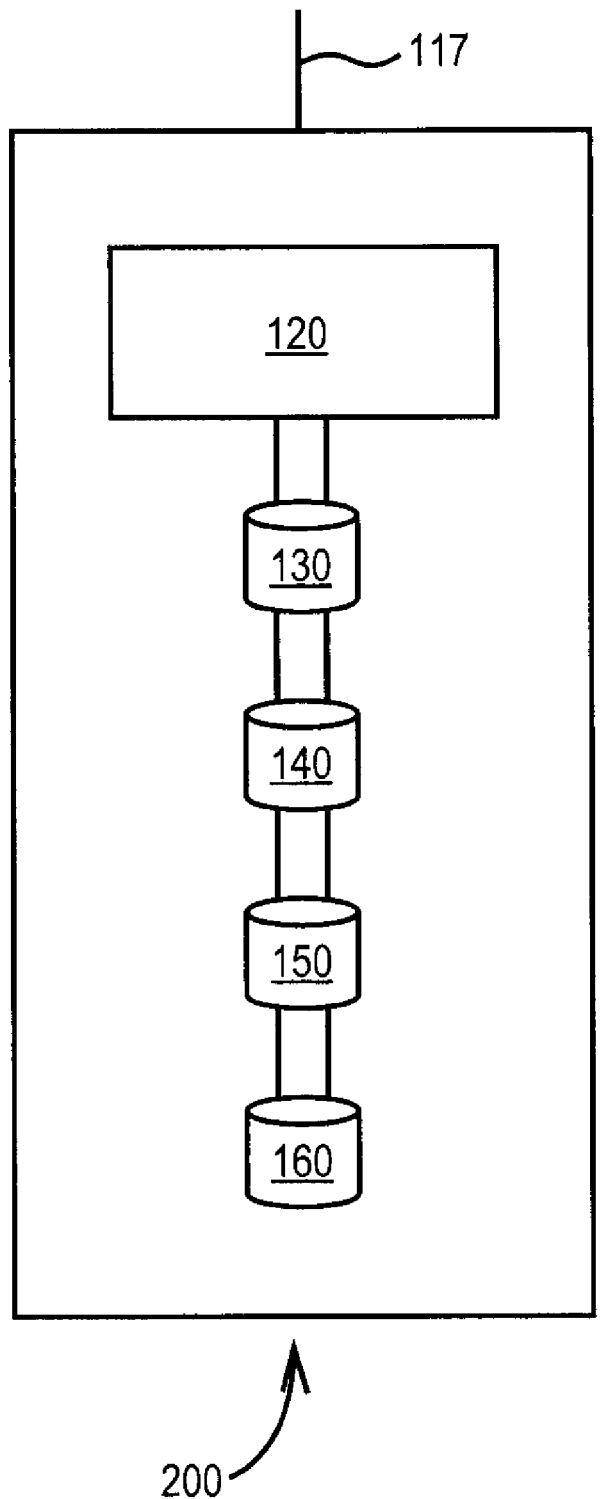
FIG. 2A is a block diagram showing one RAID controller in communication with a plurality of data storage media using a fibre channel arbitrated loop.

In the illustrated embodiment of FIG. 2A, Applicants' RAID controller 120 communicates with data storage media 130, 140, 150, and 160, using a fibre channel arbitrated ("FC-AL") loop, wherein controller 120 and media 130, 140, 150, and 160, are disposed in information storage and retrieval system 200. As those skilled in the art will appreciate, information storage and retrieval system 200 further comprises additional elements, such as and without limitation one or more host adapters, one or more device adapters, a data cache, non-volatile storage, and the like. The illustrated embodiment of FIG. 2A should not be construed to limit Applicants' invention to use of fibre channel networks or devices. In other embodiments, other network topologies and devices are utilized, including without limitation SAS devices and/or SATA devices.

Figure 2B:
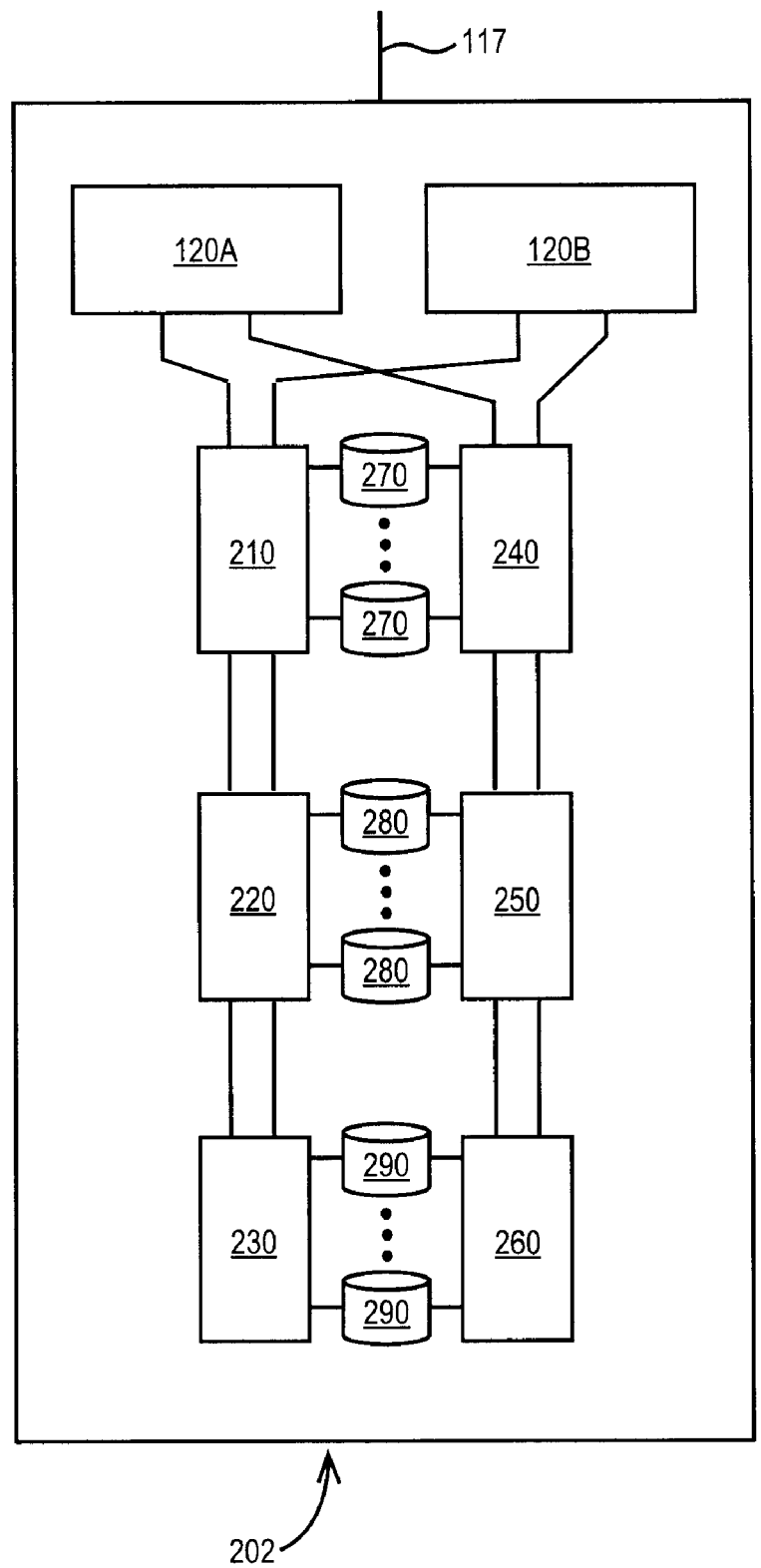
FIG. 2B is a block diagram showing two RAID controller in communication with a plurality of data storage media using dual fibre channel arbitrated loops.

In the illustrated embodiment of FIG. 2B, Applicants' information storage and retrieval system 202 comprises dual FC-AL loops wherein RAID controller 120A and RAID controller 120B are interconnected with both FC-AL loops. Each FC-AL loop contains one or more local controllers, such as local controllers 210, 220, 230, 240, 250, and 260. As those skilled in the art will appreciate, information storage and retrieval system 200 further comprises additional elements, such as and without limitation one or more host adapters, one or more device adapters, a data cache, non-volatile storage, and the like. In the illustrated embodiment of FIG. 2B, each RAID controller is in communication with a first plurality of data storage media 270, a second plurality of data storage media 280, and a third plurality of data storage media 290.

The illustrated embodiment of FIG. 2B should not be construed to limit Applicants' invention to use of fibre channel networks or devices. In the illustrated embodiment of FIG. 2B, the recitation of two FC-AL loops comprises one embodiment of Applicants' apparatus. In other embodiments, other network topologies and devices are utilized, including without limitation SAS devices and/or SATA devices.

Figure 3:
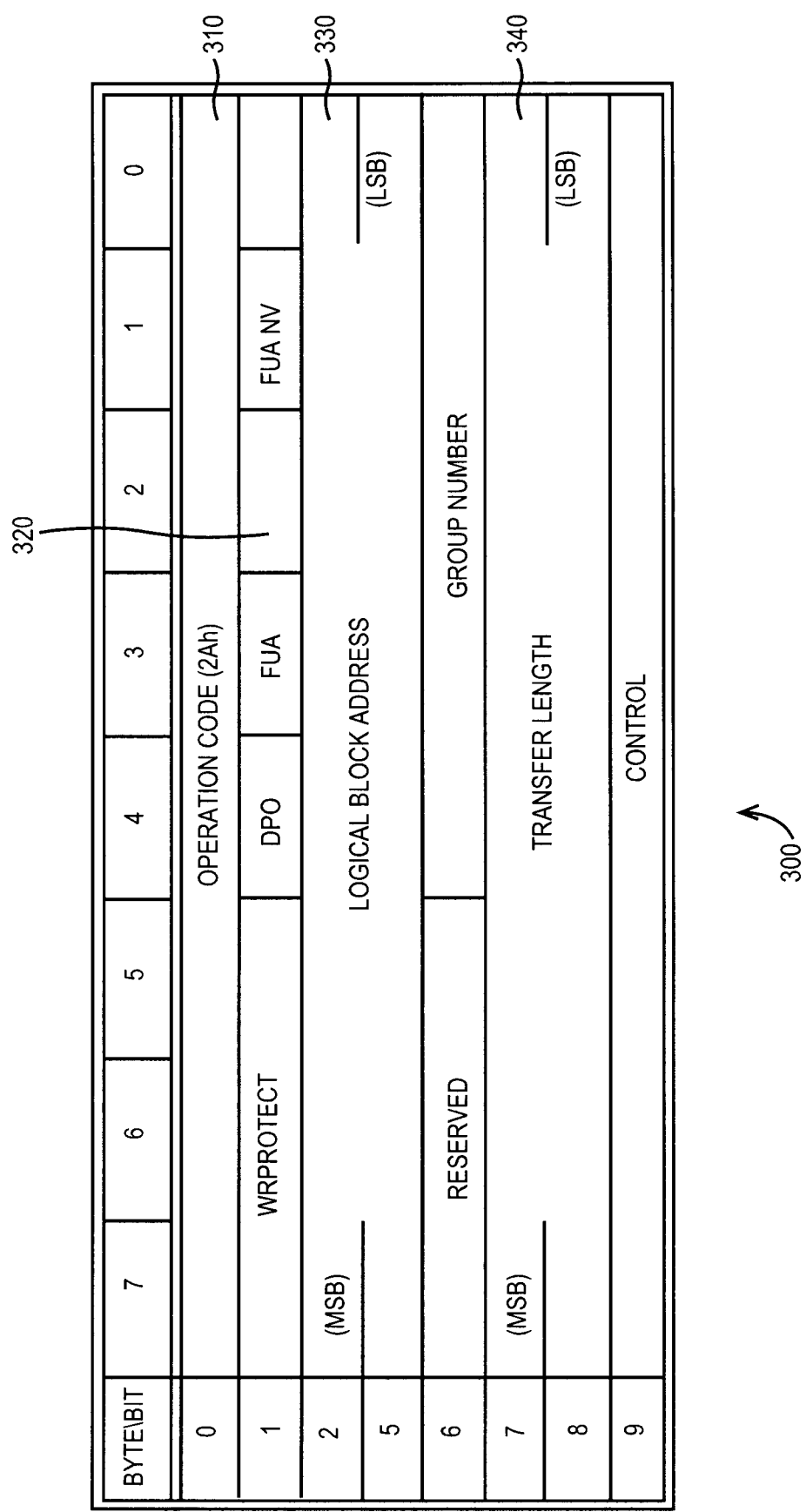
FIG. 3 illustrates Applicants' data storage media access command.

FIG. 3 illustrates one embodiment of Applicants' data access command 300. Command 300 comprises an operation code 310, a starting logical block address 330, and a transfer length 340. Operation code 310 indicates whether command 300 comprises a read command or a write command.

Command 300 further comprises data access priority indicator 320. In certain embodiments, data access priority indicator 320 comprises a bit, wherein the default setting for that bit is "0". If that bit is set to "1," then said data access priority indicator is activated. If, however, that bit is set to "0," then the data access priority indicator is not activated.

A RAID controller, such as for example RAID controller 120 (FIGS. 1, 2A, 2B), translates a starting logical block address, such as for example starting logical block address 330 and a transfer length, such as transfer length 340, into a target logical block array ("LBA") range comprising one or more entire and/or partial RAID stripes.

Figure 4:
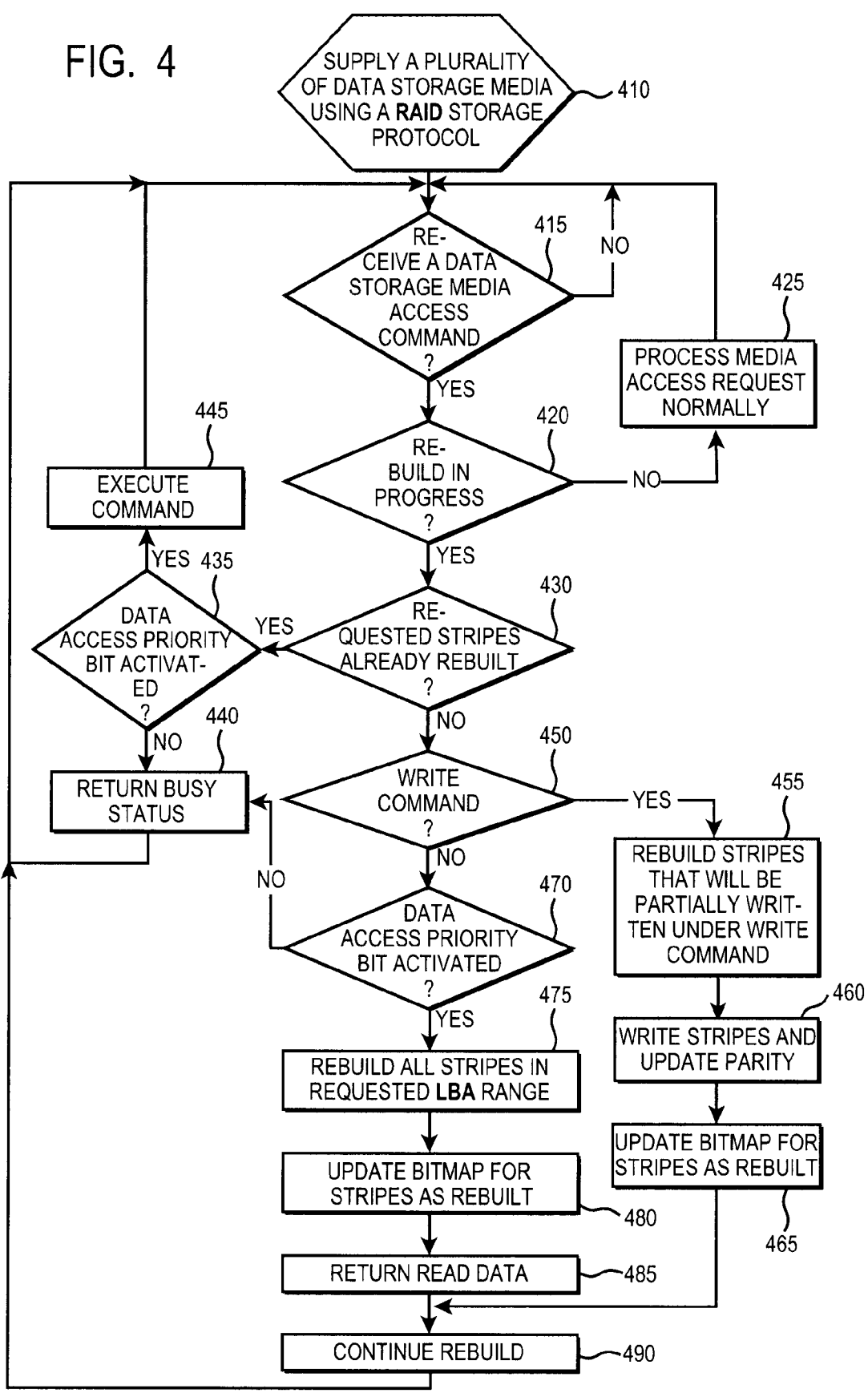
FIG. 4 is a flow chart summarizing the steps of Applicants' method.

Applicants' method allows certain data storage access requests, i.e. write commands and/or read commands, to take preference over the RAID rebuild process. Referring now to FIG. 4, in step 410 the method supplies a plurality of data storage media configured to utilize a RAID storage protocol. In certain embodiments, step 410 further comprises supplying a RAID controller in communication with each of the plurality of data storage media. In certain embodiments, step 410 further comprises supplying a data storage library comprising Applicants' RAID controller and the plurality of data storage media, wherein that data storage library is in communication with one or more host computers.

In step 415, the method determines if a data storage media access command is received. In certain embodiments, step 415 comprises receiving Applicants' data storage media access command 300. In certain embodiments, the command of step 415 is generated by a host computer in communication with Applicants' RAID controller and/or data storage library.

If the method determines in step 415 that a data storage media access command is not received, then the method continues to monitor for the receipt of a media access command. Alternatively, if the method determines in step 415 that a data storage media access command is received, then the method transitions from step 415 to step 420 wherein the method determines if a RAID rebuild operation is in progress. In certain embodiments, step 420 is performed by a RAID controller, such as for example RAID controller 120 (FIGS. 1, 2A, 2B). If the method determines in step 420 that a RAID rebuild is not in progress, then the method transitions to step 425 wherein the method processes the media access command of step 415 normally. Alternatively, if the method determines in step 420 that a RAID rebuild is in progress, then the method transitions to step 430 wherein the method determines if all the data stripes in the target LBA range have already been rebuilt. In certain embodiments, step 430 is performed by a RAID controller, such as RAID controller 120 (FIGS. 1, 2A, 2B).

If the method determines in step 430 that all the data stripes in the target LBA range have already been rebuilt, then the method transitions from step 430 to step 435 wherein the method determines if the command of step 415 comprises an activated data access priority bit. In certain embodiments, step 435 comprises determining if bit 320 in command 300, is set to "1". In certain embodiments, step 435 is performed by a RAID controller, such as RAID controller 120 (FIGS. 1, 2A, 2B).

If the method determines in step 435 that the command of step 415 does not comprise an activated data access priority bit, then the method transitions from step 435 to step 440 wherein the method returns a busy status. In certain embodiments, step 440 comprises providing a busy status signal to a host computer that initiated the command of step 415. In certain embodiments, step 440 is performed by a RAID controller, such as RAID controller 120 (FIGS. 1, 2A, 2B). The method transitions from step 440 to step 415 and continues as described herein.

If the method determines in step 435 that the command of step 415 does comprise an activated data access priority bit, then the method transitions from step 435 to step 445 wherein the method executes the command of step 415. In certain embodiments, step 445 comprises temporarily suspending the RAID rebuild while executing the command of step 415. In certain embodiments, step 445 is performed by a RAID controller, such as RAID controller 120 (FIGS. 1, 2A, 2B). The method transitions from step 445 to step 415 and continues as described herein.

If the method determines in step 430 that all the data stripes in the target LBA range have not been rebuilt, then the method transitions from step 430 to 450 wherein the method determines if the command of step 415 comprises a write command. In certain embodiments, step 450 is performed by a RAID controller, such as RAID controller 120 (FIGS. 1, 2A, 2B).

If the method determines in step 450 that the command of step 415 does not comprise a write command, i.e. the command comprises a read command, then the method transitions from step 450 to step 470 wherein the method determines if the read command of step 415 comprises an activated data access priority indicator. In certain embodiments, step 470 comprises determining if bit 320 in command 300, is set to "1". In certain embodiments, step 470 is performed by a RAID controller, such as RAID controller 120 (FIGS. 1, 2A, 2B).

If the method determines in step 470 that the read command of step 415 does not comprise an activated data access priority indicator, then the method transitions from step 470 to step 440 and continues as described herein. Alternatively, if the method in step 470 determines that the read command of step 415 does comprise an activated data access priority indicator, then the method transitions from step 470 to step 475 wherein the method rebuilds all stripes in the target LBA range. In certain embodiments, step 475 is performed by a RAID controller, such as RAID controller 120 (FIGS. 1, 2A, 2B).

In step 480, the method updates a bitmap, such as rebuild bitmap 126 (FIG. 1) for the stripes as rebuilt. In certain embodiments, step 480 is performed by a RAID controller, such as RAID controller 120 (FIGS. 1, 2A, 2B).

In step 485, the method copies the target LBA range, and returns that read data to the requestor of step 415. In certain embodiments, the method in step 485 suspends the RAID rebuild. In certain embodiments, step 485 is performed by a RAID controller, such as RAID controller 120 (FIGS. 1, 2A, 2B).

In step 490, the method resumes the RAID rebuild process. In certain embodiments, step 490 is performed by a RAID controller, such as RAID controller 120 (FIGS. 1, 2A, 2B).

If the method determines in step 450 that the command of step 415 does comprise a write command, then the method transitions from step 450 to step 455 wherein the method rebuilds stripes that will be partially written under the write command of step 415. In certain embodiments, step 455 is performed by a RAID controller, such as RAID controller 120 (FIGS. 1, 2A, 2B).

In step 460, the method writes the stripes in a target logical block array range determined using the write command of step 415. In certain embodiments, the method in step 460 suspends the RAID rebuild. In certain embodiments, step 460 is performed by a RAID controller, such as RAID controller 120 (FIGS. 1, 2A, 2B).

In step 465, the method updates a bitmap, such as rebuild bitmap 126 (FIG. 1) for the stripes as rebuilt. In certain embodiments, step 465 is performed by a RAID controller, such as RAID controller 120 (FIGS. 1, 2A, 2B). The method transitions from step 465 to step 490 and continues as described herein.

In certain embodiments, individual steps recited in FIG. 4, may be combined, eliminated, or reordered.

In certain embodiments, Applicants' invention includes instructions, such as instructions 124 (FIG. 1), residing in computer readable medium, such as for example memory 121 (FIG. 1 wherein those instructions are executed by a processor, such as processor 128 (FIG. 1), to perform one or more of steps 415, 420, 425, 430, 435, 440, 445, 450, 455, 460, 465, 470, 475, 480, 485, and/or 490, recited in FIG. 4.

In other embodiments, Applicants' invention includes instructions residing in any other computer program product, where those instructions are executed by a computer external to, or internal to, system 100, to perform one or more of steps 330, 340, 350, 360, 370, and/or 380, recited in FIG. 3, and/or one or more of steps 415, 420, 425, 430, 435, 440, 445, 450, 455, 460, 465, 470, 475, 480, 485, and/or 490, recited in FIG. 4. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to access a data in a RAID array, comprising the steps of:
   supply a plurality of data storage media, wherein information is written to said plurality of data storage media using a RAID configuration;
   receiving from a requestor a command selected from the group consisting of writing information to, and reading information from, one or more of said plurality of data storage media, wherein said command comprises a data access priority indicator;
   establishing a target logical block array range;
   determining if a RAID rebuild of said plurality of data storage media is in progress;
   operative if a RAID rebuild of said plurality of data storage media is in progress, determining if each of one or more stripes comprising said target logical block array range have already been rebuilt;
   operative if each of one or more stripes comprising said target logical block array range have already been rebuilt, determining if said data access priority indicator is set;
   operative if said data access priority indicator is set, executing a command selected from the group consisting of writing information to said target logical block array range, and returning to said requestor information read from said target logical block array range
   operative if said data priority indicator is not set, returning a busy signal.

2. The method of claim 1, wherein said data access priority indicator comprises a bit, wherein if said bit is set to "1" then said data access priority indicator is set, and wherein if said bit is set to "0" then said data access priority indicator is not set.

3. The method of claim 1, further comprising the step of executing said command if a RAID rebuild of said plurality of data storage media is not in progress.

4. The method of claim 1, further comprising the steps of:
   operative if each of one or more stripes comprising said target logical block array range have not already been rebuilt, determining if said command comprises a write command;
   operative if said command is a write command, rebuilding all stripes in said target logical block array range;
   executing said write command.

5. The method of claim 4, further comprising the steps of:
   updating parity;
   updating a bitmap for all stripes as rebuilt.

6. The method of claim 5, further comprising the steps of continuing said RAID rebuild.

7. The method of claim 4, further comprising the steps of:
   operative if said command is not a write command, determining if said data access priority indicator is set;
   operative if said data access priority indicator is not set, returning a busy signal.

8. The method of claim 7, further comprising the steps of:
   operative if said data access priority indicator is set;
   rebuilding all stripes comprising said target logical block array range;
   updating a bit map for all stripes as rebuilt; and
   returning read data.

9. The method of claim 8, further comprising the step of continuing said RAID rebuild.

10. An article of manufacture comprising a processor and a computer readable medium having computer readable program code disposed therein to access data in a RAID array, wherein said RAID array comprises a plurality of data storage media, wherein information is written to said plurality of data storage media using a RAID configuration, the computer readable program code comprising a series of computer readable program steps to effect:
    receiving from a requestor a command selected from the group consisting of writing information to, and reading information from, one or more of said plurality of data storage media, wherein said command comprises a data access priority indicator;
    establishing a target logical block array range;
    determining if a RAID rebuild of said plurality of data storage media is in progress;
    operative if a RAID rebuild of said plurality of data storage media is in progress, determining if each of one or more stripes comprising said target logical block array range have already been rebuilt;
    operative if each of one or more stripes comprising said target logical block array range have already been rebuilt, determining if said data access priority indicator is set;
    operative if said data access priority indicator is set, executing a command selected from the group consisting of writing information to said target logical block array range, and returning to said requestor information read from said target logical block array range;
    operative if said data priority indicator is not set, returning a busy signal.

11. The article of manufacture of claim 10, wherein said data access priority indicator comprises a bit, wherein if said bit is set to "1" then said data access priority indicator is set, and wherein if said bit is set to "0" then said data access priority indicator is not set.

12. The article of manufacture of claim 10, said computer readable program code further comprising a series of computer readable program steps to effect returning a busy signal if said data access priority indicator is not set.

13. The article of manufacture of claim 10, said computer readable program code further comprising a series of computer readable program steps to effect executing said command if a RAID rebuild of said plurality of data storage media is not in progress.

14. The article of manufacture of claim 10, said computer readable program code further comprising a series of computer readable program steps to effect:

operative if each of one or more stripes comprising said target logical block array range have not already been rebuilt, determining if said command comprises a write command;

operative if said command is a write command, rebuilding all stripes in said target logical block array range;

executing said write command.

15. The article of manufacture of claim 14, said computer readable program code further comprising a series of computer readable program steps to effect:

updating parity;

updating a bitmap for all stripes as rebuilt.

16. The article of manufacture of claim 15, said computer readable program code further comprising a series of computer readable program steps to effect continuing said RAID rebuild.

17. The article of manufacture of claim 14, said computer readable program code further comprising a series of computer readable program steps to effect:

operative if said command is not a write command, determining if said data access priority indicator is set;

operative if said data access priority indicator is not set, returning a busy signal.

18. The article of manufacture of claim 17, said computer readable program code further comprising a series of computer readable program steps to effect:

operative if said data access priority indicator is set;

rebuilding all stripes comprising said target logical block array range;

updating a bit map for all stripes as rebuilt; and returning read data.

19. The article of manufacture of claim 18, said computer readable program code further comprising a series of computer readable program steps to effect continuing said RAID rebuild.

* * * * *